US012756810B1

(12) United States Patent
Chen

(10) Patent No.: US 12,756,810 B1
(45) Date of Patent: Oct. 6, 2026

(54) SYSTEM OF CONVERTING 2D IMAGE TO MULTI-VIEW IMAGE FOR STEREOSCOPIC DISPLAY AND METHOD THEREOF

(71) Applicant: LIGHT MATRIX INC., Taipei City (TW)

(72) Inventor: Wei-Ting Chen, Taipei City (TW)

(73) Assignee: LIGHT MATRIX INC., Taipei City (TW)

( * ) Notice: Subject to any disclaimer, the term of this patent is extended or adjusted under 35 U.S.C. 154(b) by 0 days.

(21) Appl. No.: 19/260,646

(22) Filed: Jul. 7, 2025

(30) Foreign Application Priority Data

Apr. 14, 2025 (TW) ................................ 114114031

(51) Int. Cl.
*H04N 13/268* (2018.01)
*G06Q 30/04* (2012.01)
*H04N 13/00* (2018.01)

(52) U.S. Cl.
CPC ........... *H04N 13/268* (2018.05); *G06Q 30/04* (2013.01); *H04N 2013/0081* (2013.01); *H04N 2013/0092* (2013.01)

(58) Field of Classification Search
None
See application file for complete search history.

(56) References Cited

U.S. PATENT DOCUMENTS 12,081,722 B2 * 9/2024 Tan ........................ G06V 10/82
2010/0111417 A1 * 5/2010 Ward ...................... G06T 7/579 382/173
2016/0227185 A1 * 8/2016 Nims .................. H04N 13/128
2016/0261847 A1 * 9/2016 Kim ..................... H04N 13/261
2022/0286658 A1 * 9/2022 Tan ........................ G06V 40/18
2023/0052104 A1 * 2/2023 Yang ....................... G06F 3/011
2023/0120611 A1 * 4/2023 Polchin .................. A61B 90/25 348/47
2024/0007611 A1 * 1/2024 Chen .................... H04N 13/327

FOREIGN PATENT DOCUMENTS

CA 2898542 C * 1/2018 ........... H04N 13/161
CA 3210887 A1 * 8/2022 ............. G06T 11/10
CN 108520232 A * 9/2018 ........... H04N 13/106

(Continued)

*Primary Examiner* — Ricky Chin
(74) *Attorney, Agent, or Firm* — Chih Feng Yeh; Yongjean Consulting Inc.

(57) ABSTRACT

A system of converting a 2D image to a multi-view image for stereoscopic display and a method thereof are disclosed. In the system, the cloud server controls the client to upload a target image, which is 2D, the file conversion server performs image enhancement computation on an initial depth map of the target image to generate a depth-enhanced image, and generate a multi-view image matching a grating film property of a stereoscopic display device based on the depth-enhanced image, the stereoscopic display device displays the multi-view image, superimposes gratings with the multi-view image to present the display images of the multi-view image by viewing angles, respectively, to generate a stereoscopic image through optical principles, thereby preventing malicious use of an image conversion service, and achieving the technical effect of providing different conversion processing efficiencies with different payment plans.

10 Claims, 8 Drawing Sheets

(56) References Cited

FOREIGN PATENT DOCUMENTS

| | | | | | |
|---|---|---|---|---|---|
| CN | 116708746 | A | * | 9/2023 | ........... H04N 13/305 |
| CN | 119277040 | A | * | 1/2025 | ............. H04N 13/31 |
| KR | 101341597 | B1 | * | 12/2013 | ........... H04N 13/268 |
| KR | 20160086802 | A | * | 7/2016 | ........... H04N 13/128 |
| KR | 20190026004 | A | * | 3/2019 | ............. G02B 30/00 |
| KR | 20220025610 | A | * | 3/2022 | ............. B62K 3/002 |
| TW | 1476731 | B | * | 3/2015 | ........... H04N 13/398 |
| TW | 1536832 | B | * | 6/2016 | ........... H04N 13/106 |
| TW | 1683280 | B | * | 1/2020 | ............. B62K 3/002 |
| WO | WO-2015100490 | A1 | * | 7/2015 | ........... H04N 21/816 |
| WO | WO-2017130472 | A1 | * | 8/2017 | ........... H04N 13/268 |

* cited by examiner

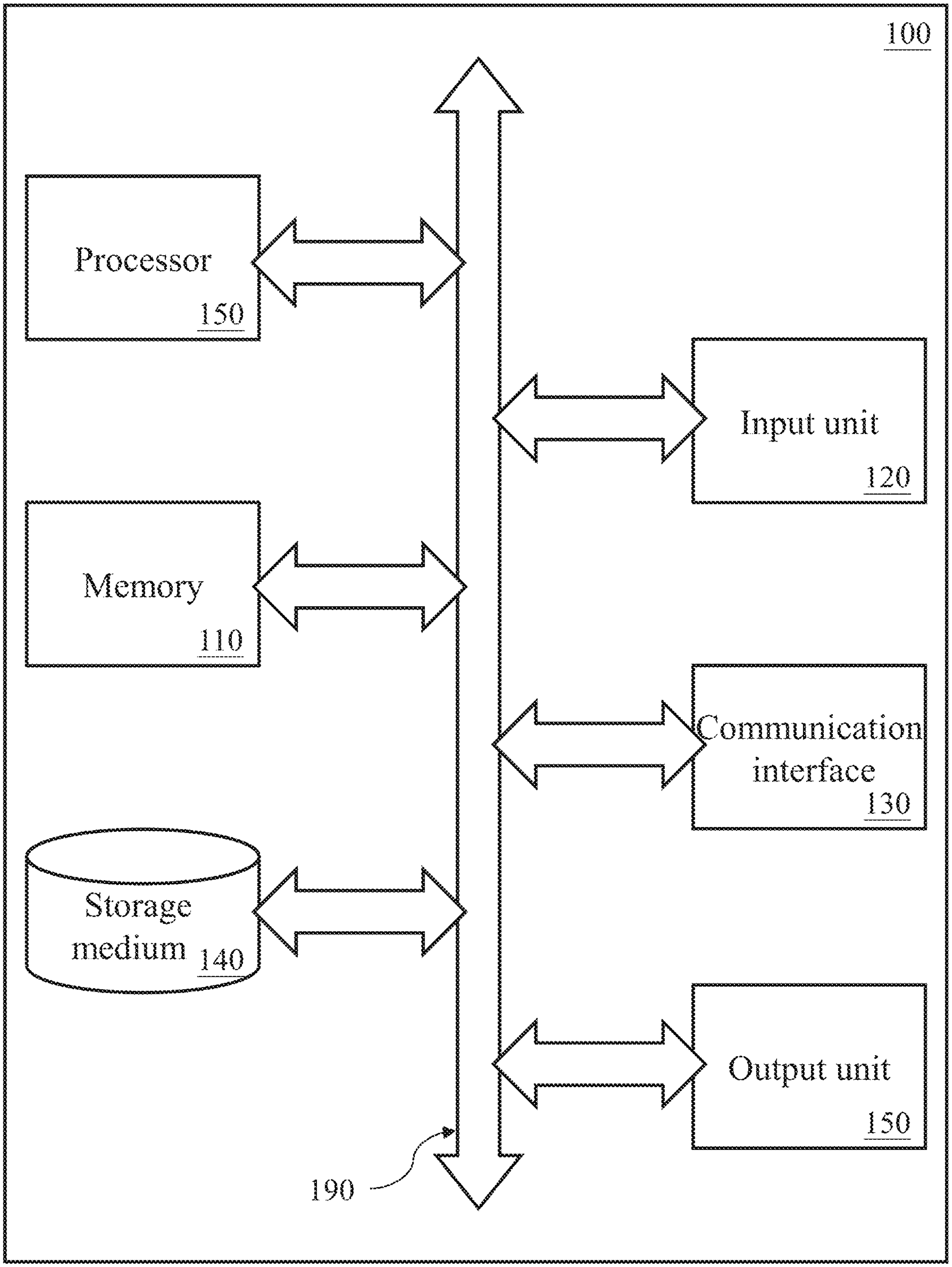
【FIG. 1】

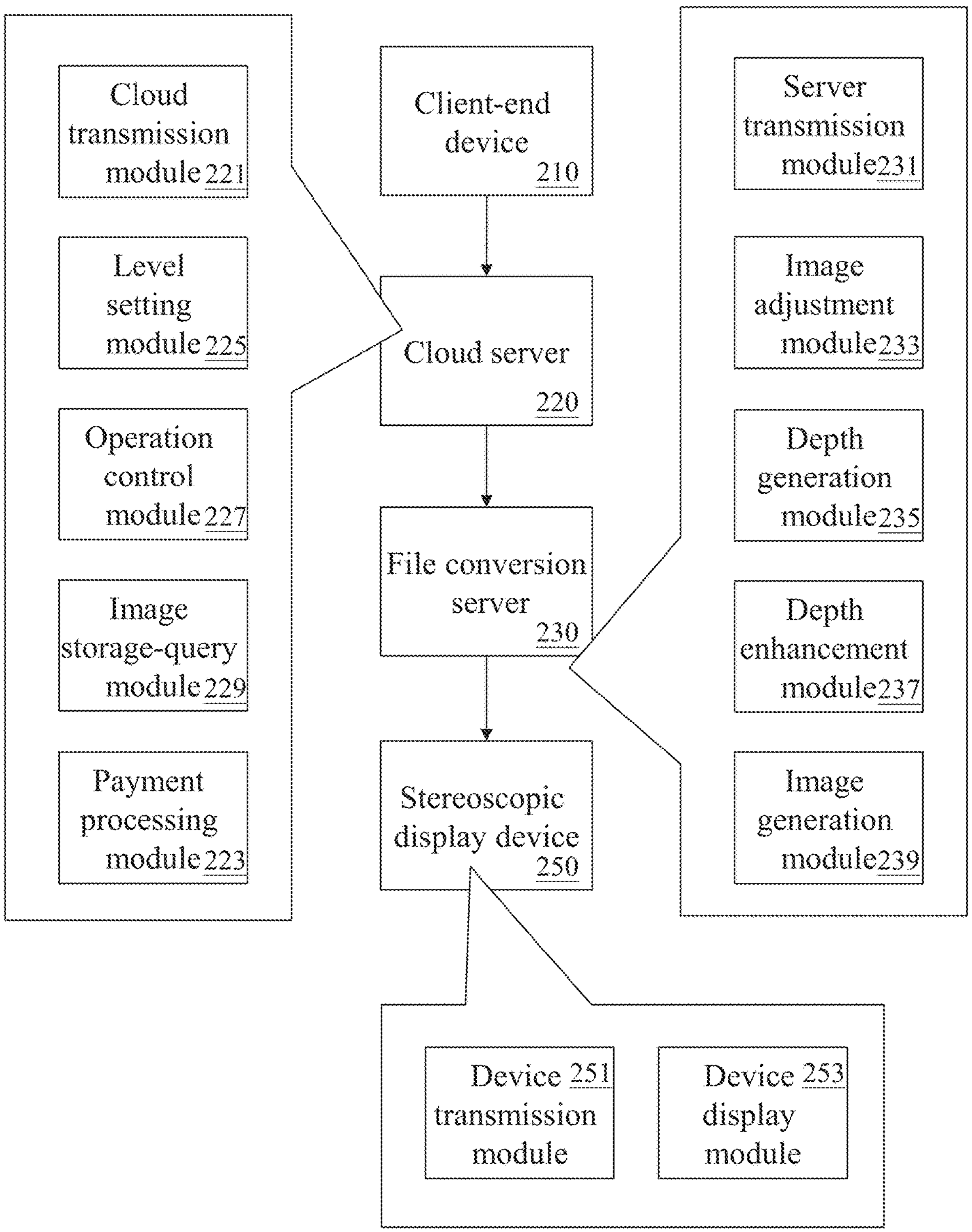
【FIG. 2】

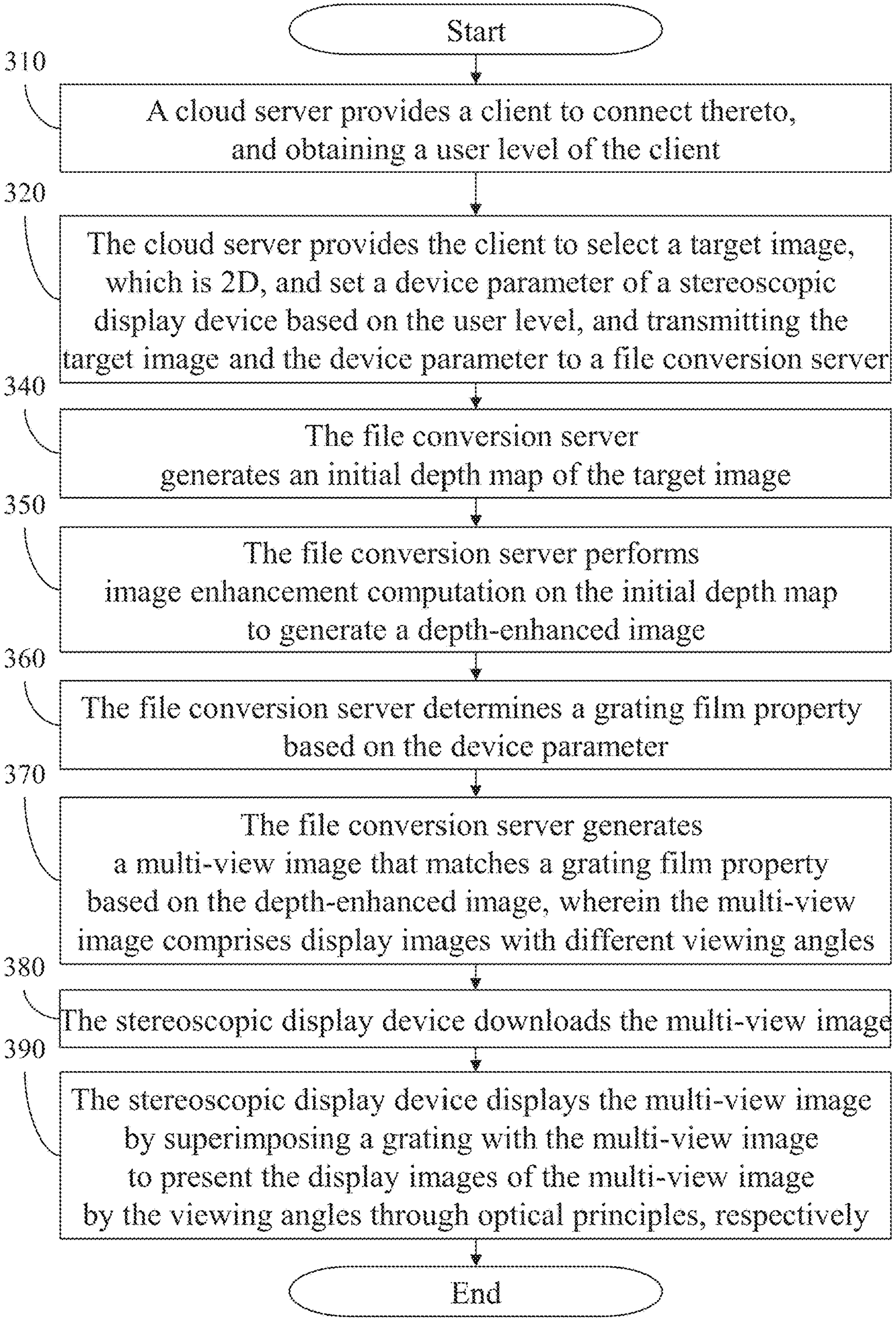
【FIG. 3A】

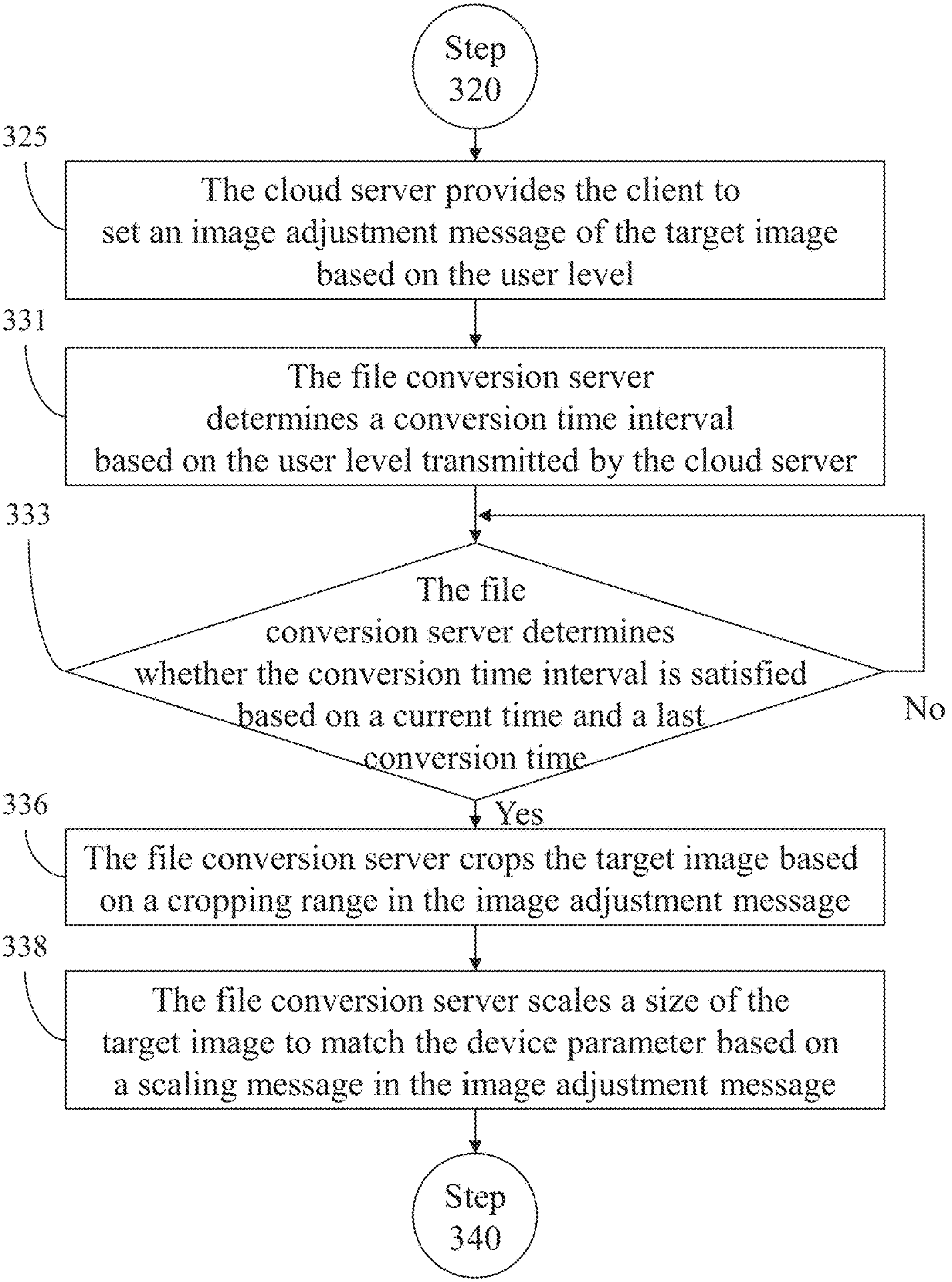
【FIG. 3B】

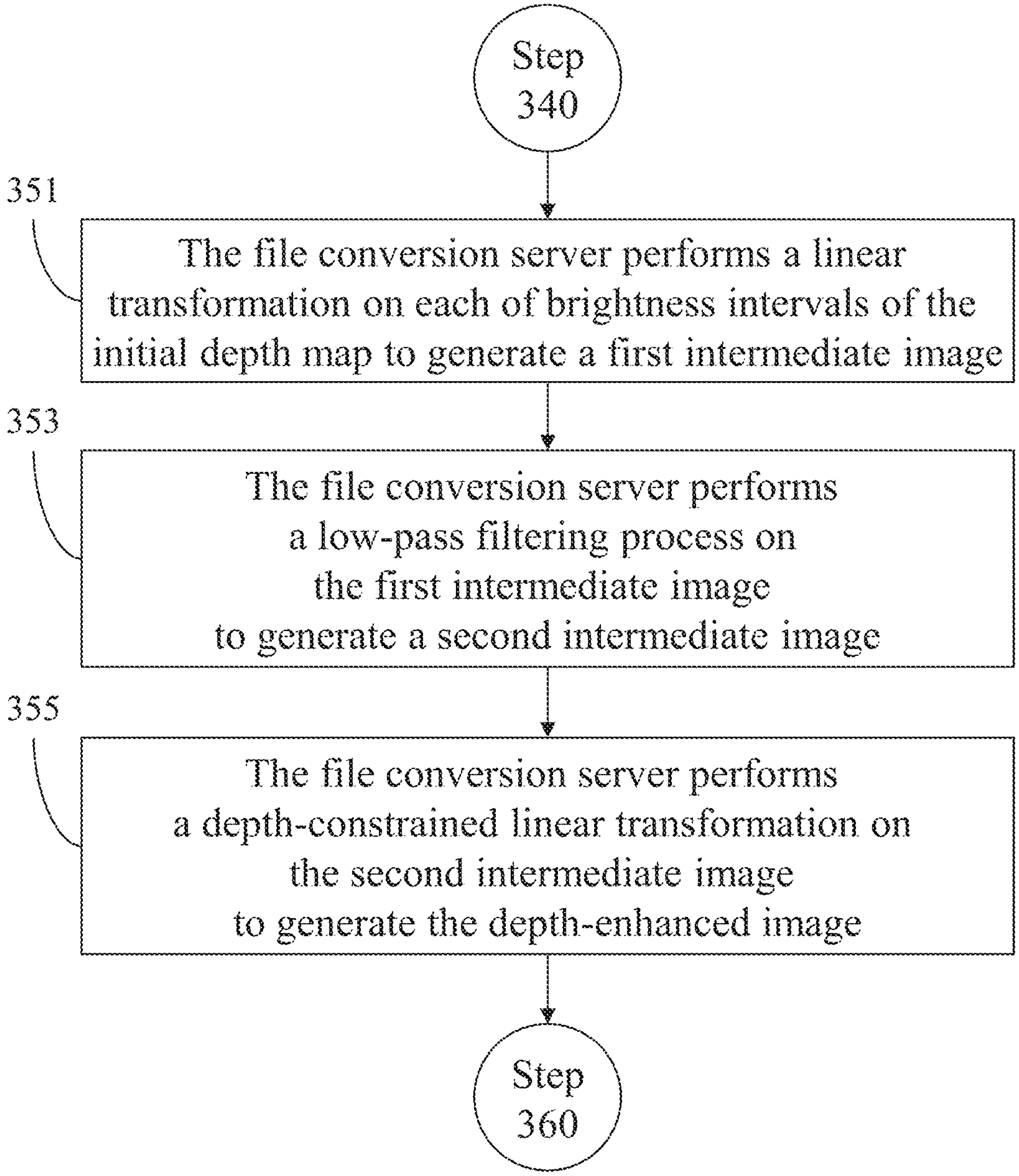
【FIG. 3C】

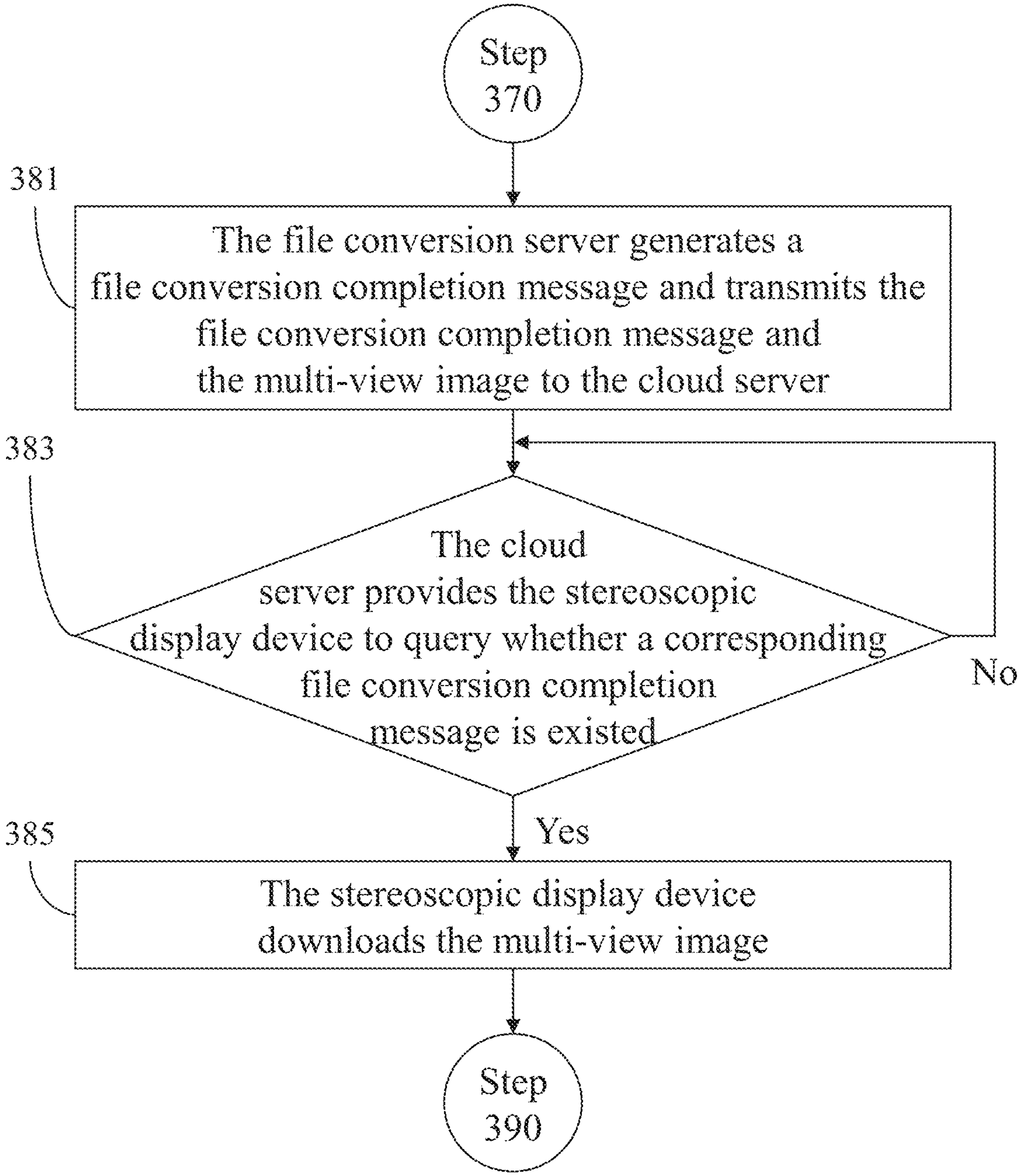
【FIG. 3D】

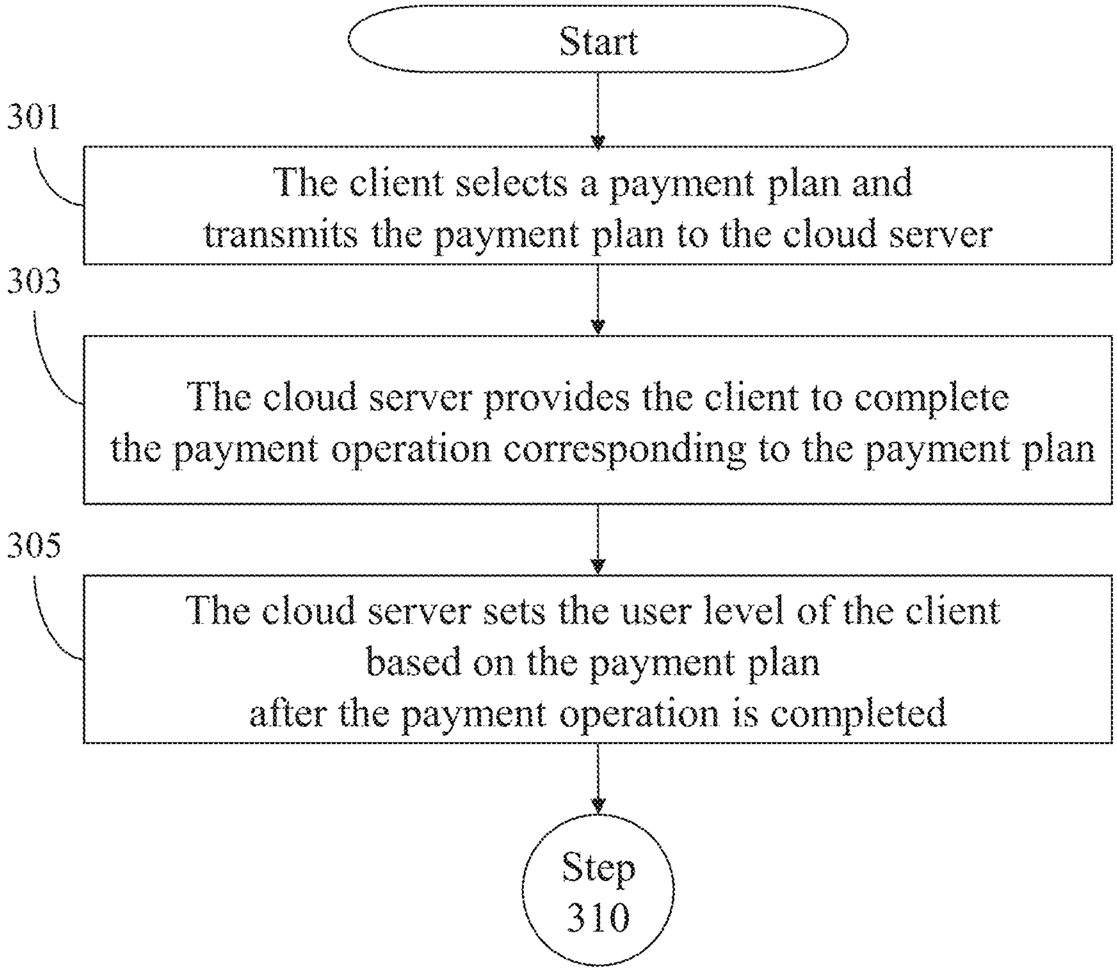
【FIG. 3E】

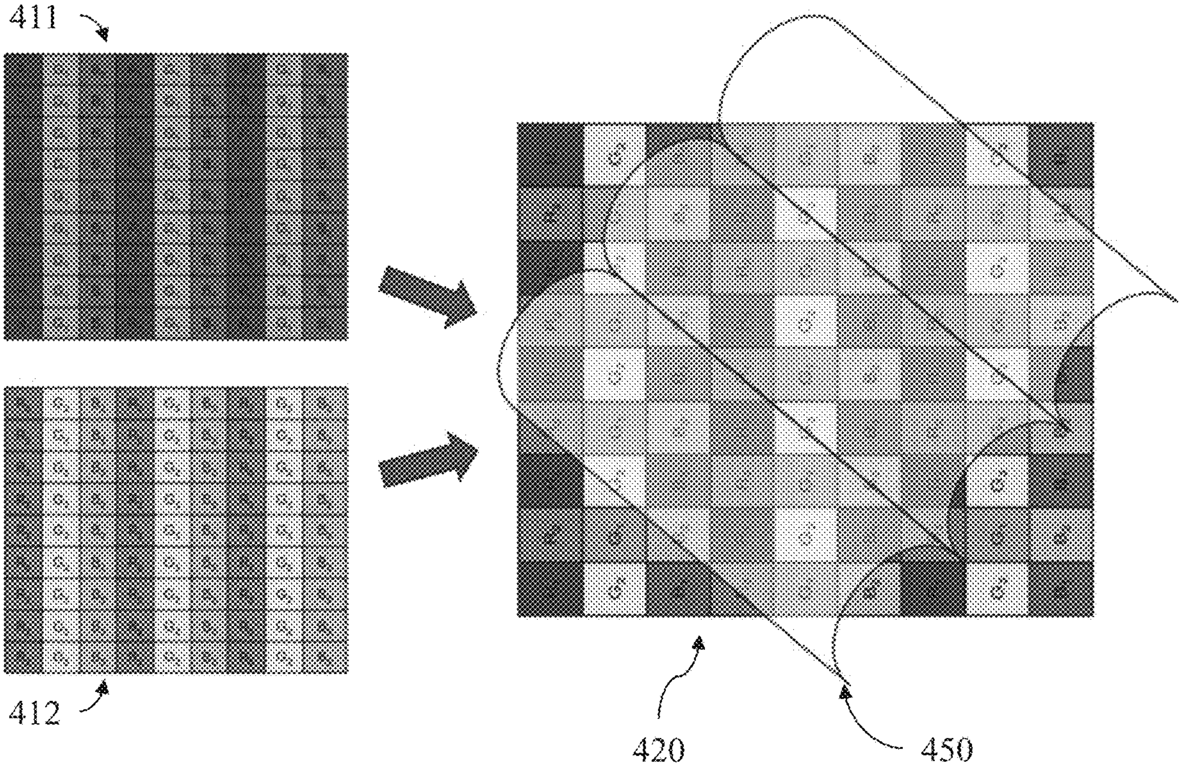
【FIG. 4】

SYSTEM OF CONVERTING 2D IMAGE TO MULTI-VIEW IMAGE FOR STEREOSCOPIC DISPLAY AND METHOD THEREOF

CROSS-REFERENCE STATEMENT

The present application is based on, and claims priority from, TAIWAN Patent Application Serial Number 114114031, filed 2025 Apr. 14, the disclosure of which is hereby incorporated by reference herein in its entirety thereof.

BACKGROUND OF THE INVENTION

1. Field of the Invention

The present invention is related to a multi-view image conversion system and a method thereof, and particularly to a system of converting a 2D image to a multi-view image for stereoscopic display and a method thereof.

2. Description of the Related Art

In recent years, the technology of image processing has continuously advanced, and it represents the continuous pursuit of more realistic visual experiences by humans. In addition, the general improvement of image and color processing technology, the processing of multi-view stereoscopic image further enhances the visual experience of three-dimensional space. For example, the entertainment industry, medical systems, and other places widely use stereoscopic image display technology.

However, to provide a comfortable stereoscopic image for viewers, the stereoscopic image needs to be displayed with a multi-view image. Unfortunately, the cost of multi-viewing angle cameras is high, making it difficult to see comfortable stereoscopic image displays. To solve the above problem, some companies use a depth image generation technology based on optical projection principles to generate 2D images with other viewing angles by performing preprocessing, 3D warping, and hole filling on the two-dimensional image with the depth map, and using the original 2D image and other 2D images with other viewing angle to generate a multi-view image that can provide stereoscopic display, thereby solving this problem.

However, due to the distortion of other two-dimensional images generated by the conventional depth image generation technology, the quality of the stereoscopic image displayed by the multi-view image generated by the depth image generation technology is not sufficient to meet the needs of people for comfortable viewing of three-dimensional images. Therefore, there are proposals to improve the depth image generation technology, but most of the proposals require sufficient computing power.

With the popularization of network services, manufacturers may provide free versions of network services for various reasons, such as image conversion services, so people can use free services. However, in fact, there are not many people willing to pay for network services. At the same time, some users not only do not want to pay, but also maliciously use free network services for a long time, and it causes too high load of the network service and results in other users being unable to use the network services smoothly. Therefore, manufacturers providing network services often need to spend extra cost to purchase hardware equipment with higher computing power to provide services or need to spend extra manpower to prevent users from maliciously using the services.

According to the above-mentioned contents, what is needed is to develop an improved solution to solve the conventional problem that free image conversion services requiring high cost to set up may be maliciously used.

SUMMARY OF THE INVENTION

An objective of the present invention is to disclose a system of converting a 2D image to a multi-view image for stereoscopic display and a method thereof, to solve the problem that free image conversion services requiring high cost to set up may be maliciously used.

To achieve the objective, the present invention provides a system of converting a 2D image to a multi-view image for stereoscopic display, and the system at least includes a client, a cloud server, a file conversion server, and a stereoscopic display device. The cloud server is configured to provide the client to connect thereto, and obtain a user level of the client, provide the client to select a target image, which is 2D, and set a device parameter based on the user level. The file conversion server is configured to receive the target image and the device parameter, and use the deep learning model to generate an initial depth map of the target image, perform at least one image enhancement computation on the initial depth map to generate a depth-enhanced image, and determine a grating film property based on the device parameter, and generate a multi-view image that matches the grating film property based on the depth-enhanced image, wherein the multi-view image comprises display images and viewing angles of the display images are different from each other. The stereoscopic display device corresponds the device parameter and includes a grating film, wherein the grating film comprises a grating, and the stereoscopic display device is configured to download the multi-view image, and display the multi-view image by superimposing the grating with the multi-view image to present the display images of the multi-view image by the viewing angles through optical principles, respectively.

To achieve the objective, the present invention provides a method of converting a 2D image to a multi-view image for stereoscopic display, and the method includes steps of: providing a client to connect and obtaining a user level of the client, by a cloud server; providing the client to select a target image, which is 2D, and set a device parameter of a stereoscopic display device based on the user level, and transmitting the target image and the device parameter to a file conversion server, by the cloud server; using a deep learning model to generate an initial depth map of the target image, by the file conversion server; performing at least one image enhancement computation on the initial depth map to generate a depth-enhanced image, by the file conversion server; determining a grating film property of the stereoscopic display device based on the device parameter, by the file conversion server; generating a multi-view image that matches a grating film property based on the depth-enhanced image, by the file conversion server, wherein the multi-view image comprises display images and viewing angles of the display image are different from each other; downloading the multi-view image, by the stereoscopic display device; displaying the multi-view image by superimposing a grating with the multi-view image to present the display images of the multi-view image by the viewing angles through optical principles, respectively, by the stereoscopic display device.

According to the above-mentioned system and method of the present invention, the difference between the present invention and the conventional technology is that, in the present invention, the cloud server controls the client to upload the 2D target image, the file conversion server performs the image enhancement computation on the initial depth map of the target image to generate the depth-enhanced image, and generate the multi-view image matching the grating film property of the stereoscopic display device based on the depth-enhanced image, the stereoscopic display device displays the multi-view image, superimposes the grating with the multi-view image to present the display images of the multi-view image by viewing angles, respectively to generate the stereoscopic image through optical principles. With the above-mentioned solution, the present invention can solve the conventional problem and achieve the technical effect of providing different conversion processing efficiencies with different payment plans.

BRIEF DESCRIPTION OF THE DRAWINGS

The structure, operating principle and effects of the present invention will be described in detail by way of various embodiments which are illustrated in the accompanying drawings.

FIG. 1 is a schematic view of components of a computing apparatus, according to the present invention.

FIG. 2 is a schematic view of components of a system of converting a 2D image to a multi-view image for stereoscopic display, according to the present invention.

FIG. 3A is a flowchart of a method of converting a 2D image to a multi-view image for stereoscopic display, according to the present invention.

FIG. 3B is a flowchart of an additional part of a method of converting a 2D image to a multi-view image for stereoscopic display, according to the present invention.

FIG. 3C a flowchart of generating a depth-enhanced image, according to the present invention.

FIG. 3D is a flowchart of downloading a multi-view image by a stereoscopic display device, according to the present invention.

FIG. 3E is a flowchart of setting a client user level by a cloud server, according to the present invention.

FIG. 4 is a schematic view of a multi-view image having interleaved subpixels, according to an embodiment of the present invention.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first,' 'second,' 'third,' and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include," and variations such as "comprises," "comprising," "includes," or "including," will be acknowledged to imply the inclusion of stated elements but not the exclusion of any other elements.

In the present invention, a cloud server first controls the number of target images selected by the client based on a user level of a client, a file conversion server can convert a 2D target image to a multi-view image containing display images to be displayed by different viewing angles, and a stereoscopic display device can display the target image in a three-dimensional manner through superimposing a grating thereof with the displayed multi-view image.

The device for implementing the present invention can be a computing apparatus. The computing apparatus mentioned in the present invention can include, but not limited to, one or more processing module, one or more memory module, and a bus connected to different hardware components including the memory module and the processing module. Through the multiple hardware components, the computing apparatus can load and execute the operating system, so that the operating system runs on the computing apparatus and executes software or programs. In addition, the computing apparatus can include an outer shell, and the above-mentioned hardware components are disposed in the outer shell.

The bus mentioned in the present invention can include at least one type of bus, for example, the bus can include at least one of a data bus, an address bus, a control bus, an expansion bus, and a local bus. The bus of a computation device can include, but not limited to, a parallel bus such as an industry standard architecture (ISA) bus, a peripheral component interconnect (PCI) bus, a video electronics standards association (VESA) local bus, or a serial bus such as a USB, or a PCI express (PCI-E/PCIe) bus.

The processing module of the computing apparatus is coupled with the bus. The processing module includes a register group or a register space. The register group or the register space can be completely set on the processing chip of the processing module, or can be all or partially set outside the processing chip and is coupled to the processing chip through dedicated electrical connection and/or a bus. The processing module can be a central processing unit, a microprocessor, or any suitable processing component. If the computing apparatus is a multi-processor apparatus, that is, the computing apparatus includes processing modules, and the processing modules can be all the same or similar, and coupled and communicated with each other through a bus. The processing module can interpret a computer instruction or a series of multiple computer instructions to perform specific operations or operations, such as mathematical operations, logical operations, data comparison, data copy/moving, so as to drive other hardware component, execute the operating system, or execute various programs and/or module in the computing apparatus. The computer instructions can include assembly language instructions, instruction set architecture instructions, machine instructions, machine-related instructions, microinstructions, firmware instructions, or source code or object code written in one or more programming languages. The instructions can be executed entirely on a single computing apparatus, partially on a single computing apparatus, or partially on one computing apparatus and partially on another interconnected computing apparatus. The above-mentioned programming language can be, for example, object-oriented languages such as Common Lisp, Python, C++, Objective-C, Smalltalk, Delphi, Java, Swift, C#, Perl, Ruby, as well as procedural languages like C or similar languages.

The computing apparatus usually also includes one or more chipsets. The processing module of the computing apparatus can be coupled to the chipset, or electrically connected to the chipset through the bus. The chipset includes one or more integrated circuits (IC) including a memory controller and a peripheral input/output (I/O) controller, that is, the memory controller and the peripheral input/output controller can be implemented by one integrated circuit, or implemented by two or more integrated circuits. Chipsets usually provide I/O and memory management functions, and multiple general-purpose and/or dedicated-purpose registers, timers. The above-mentioned general-purpose and/or dedicated-purpose registers and timers can be coupled to or electrically connected to one or more processing modules to the chipset for being accessed or used.

The processing module of the computing apparatus can also access the data stored in the memory module and mass storage area installed on the computing apparatus through the memory controller. The above-mentioned memory modules include any type of volatile memory and/or non-volatile memory (NVRAM), such as Static Random Access Memory (SRAM), Dynamic Random Access Memory (DRAM), Read-Only Memory (ROM), or Flash memory. The above-mentioned mass storage area can include any type of storage device or storage medium, such as hard disk drives, optical discs, flash drives, memory cards, and solid state disks (SSD), or any other storage device. In other words, the memory controller can access data stored in static random access memory, dynamic random access memory, flash memory, hard disk drives, and solid state drives.

The processing module of the computing apparatus can also connect and communicate with peripheral devices and interfaces including peripheral output devices, peripheral input devices, communication interfaces, or data/signal receivers through the peripheral I/O controller and the peripheral I/O bus. The peripheral input device can be any type of input device, such as a keyboard, mouse, trackball, touchpad, or joystick. The peripheral output device can be any type of output device, such as a display, or a printer; the peripheral input device and the peripheral output device can also be the same device such as a touch screen. The communication interface can include a wireless communication interface and/or a wired communication interface. The wireless communication interface can include the interface capable of supporting wireless local area networks (such as Wi-Fi, Zigbee, etc.), Bluetooth, infrared, and near-field communication (NFC), 3G/4G/5G and other mobile communication network (cellular network) or other wireless data transmission protocol; the wired communication interface can be an Ethernet device, a DSL modem, a cable modem, an asynchronous transfer mode (ATM) devices, or optical fiber communication interfaces and/or components. The data/signal receiver can include a GPS receiver or physiological signal receiver. The physiological signals received by the physiological signal receiver include, but are not limited to, heartbeat, blood oxygen levels, and so on. The processing module can periodically poll various peripheral devices and interfaces, so that the computing apparatus can input and output data through various peripheral devices and interfaces, and can also communicate with another computing apparatus having the above-mentioned hardware components.

The implementation of the computing apparatus of the present invention will be explained in the following paragraphs with reference to FIG. 1, which is a schematic view of modules of a computing apparatus according to the present invention. As shown in FIG. 1, the computing apparatus 100 of the present invention includes a memory 110, an input unit 120, a communication interface 130, a storage medium 140, an output unit 150, a processor 170, and a bus 190. The processor 170 is connected to the memory 110, the input unit 120, the communication interface 130, the storage medium 140, and the output unit 150 through the bus 190.

The memory 110 stores one or more sets of computer instructions.

The input unit 120 provides input data through peripheral input devices of the computing apparatus 100. For example, the input unit 120 can input data through a keyboard, mouse, touchpad, or touch screen connected to or installed on the computing apparatus 100.

The communication interface 130 is connected to external network devices (such as network storage devices or servers) and can request to download data from the connected network devices.

The storage medium 140 stores the data or signals downloaded by the communication interface 130 and can also store the data or signals provided to or required by the processor 170 during operation, and store the data or signals generated by the processor 170.

The output unit 150 outputs the data generated by the processor 170 through peripheral output devices of the computing apparatus 100. For example, the output unit 150 can display the data generated by the processor 170 through a displayer or a touch screen connected to or installed on the computing apparatus 100.

The processor 170 executes the computer instructions stored in the memory 110 and generate each of the modules after executing the computer instructions. In another embodiment, each module in the processor 170 can be generated by one or more circuits and/or complete or partial chip hardware components, that is, the processor 170 can include hardware components that form the above-mentioned modules, so each module included in the processor 170 can be a software module or a hardware module. However, the present invention has no special limitations.

Please refer to FIG. 2, which is a schematic view of the components of the system of converting a 2D image to a multi-view image for stereoscopic display of the present invention. The present invention will be described in the following paragraphs with reference to FIG. 2. As shown in FIG. 2, the system includes a client 210, a cloud server 220, a file conversion server 230, and a stereoscopic display device 250.

The client 210 is configured to select a target image. The target image selected by the client 210 is a 2D image, that is, the planar image. It should be noted that the target image selected by the client 210 is not limited to a single image and can be multiple images.

The client 210 is also configured to set device information. The device information set by the client 210 corresponds to stereoscopic display device 250 and can indicate the stereoscopic display device 250, for example, the device information can include device identification data of the stereoscopic display device 250 and the model of stereoscopic display device 250. In an embodiment, the device identification data can be a serial number of the stereoscopic display device 250, but the present invention is not limited to these examples.

The client 210 is also configured to set the image adjustment message of the target image. The image adjustment message set by the client 210 can include a cropping range and/or a scaling message of the target image, but the present invention is not limited to the above-mentioned examples. The cropping range indicates an area of the target image that needs to be retained, such as coordinates of an upper left corner and a lower right corner of the retained area; the scaling message indicates whether the target image needs to be scaled down or up to match a resolution of a displayer of the stereoscopic display device 250.

The client 210 is also configured to transmit the selected target image and the set device parameter to the cloud server 220 and transmit the image adjustment message to the cloud server 220. Generally, when the client 210 transmits the target image and the device parameter (and the image adjustment message), the client 210 can also transmit the user identification data of a user of the client 210 to the cloud server 220, but the present invention is not limited to the above-mentioned examples.

The client 210 is also configured to select a payment plan and transmit the selected payment plan to the cloud server 220 and complete the payment operation corresponding to the selected payment plan through the cloud server 220. The payment plan selected by the client 210 can include a payment mode and a payment amount, for example, the payment mode can be one-time payment or monthly payment, and the payment amount can be a basic fee or a basic fee plus a value-added fee, but the present invention are not limited to the above-mentioned examples of the payment plan, the payment mode, and the payment amount.

The client 210 is also configured to set a display mode of the stereoscopic display device 250, and can be connected to the stereoscopic display device 250 and transmit the set display mode to the stereoscopic display device 250. The display mode set by the client 210 can be a stereoscopic display mode or a planar display mode. The client can be connected to the stereoscopic display device 250 by wired means (such as a connection cable) or wireless means (such as Wi-Fi or Bluetooth), but the present invention is not limited to the above-mentioned examples.

The cloud server 220 is configured to provide the target image to the file conversion server 230 and store the multi-view image generated by the file conversion server 230. In another embodiment, the cloud server 220 includes a cloud transmission module 221, a level setting module 225, and an operation control module 227, and can additionally include a payment processing module 223 and an image storage-query module 229.

The cloud transmission module 221 can receive the target image and the device parameter transmitted by the client 210, receive the user identification data transmitted by the client 210, and transmit the target image and the device parameter (and the user level) to the file conversion server 230. In some embodiments, the cloud transmission module 221 can receive the multi-view image and the conversion completion message transmitted by the file conversion server 230 and receive an image query request transmitted by the stereoscopic display device 250, thereby providing the stereoscopic display device 250 to query and download the multi-view image generated by the file conversion server 230 corresponding to the stereoscopic display device 250.

The payment processing module 223 is configured to provide the client 210 to complete the payment operation corresponding to the payment plan received by the cloud transmission module 221.

After the client 210 completes the payment operation through the payment processing module 223, the level setting module 225 sets the user level of the client 210 to the level corresponding to the payment plan received by the cloud transmission module 221, and can store the user identification data received by the cloud transmission module 221 and the set user level as a record in a level data table. For example, the user level can include three levels: non-member, basic member, and advanced member. Before the user of the client 210 pays the fee, the level setting module 225 sets the user level to the level of non-member; when the user of the client 210 pays the basic fee or the basic fee plus the value-added fee, the level setting module 225 sets the user level to level of basic member or advanced member, respectively, but the present invention is not limited to this example.

The operation control module 227 is configured to obtain the user level of the user of the client 210. Generally, the operation control module 227 reads the corresponding user level from a level data table established by the level setting module 225 based on the user identification data received by the cloud transmission module 221.

The operation control module 227 is configured to provide the client 210 to select the target image based on the obtained user level. It should be particularly noted that the target image selectable for different user level is different, for example, when the user level is the level of non-member, the operation control module 227 restricts the client 210 to select only one target image; when the user level is the level of basic member, the operation control module 227 restricts the client 210 to select a certain number of target images; and when the user level is the level of advanced member, the operation control module 227 does not restrict the number of target images selected by the client 210.

The operation control module 227 is configured to provide the client 210 to set the device parameter. In another embodiment, the operation control module 227 controls how the client 210 sets the device parameter based on the obtained user level, for example, when the user level is the level of non-member, the operation control module 227 controls the client 210 to input items in the device parameter, one by one; when the user level is the level of basic member or advanced member, the operation control module 227 lists the stereoscopic display devices registered by the user of the client 210, and provides the user to select one of the registered stereoscopic display devices to set the device parameter. The device parameter can include a resolution, a diagonal size, a width and a height, a pixel pitch, a range of the number of parallax images, a parallax range, a viewing distance of a displayer of the stereoscopic display device 250. The number of parallax images is the number of views provided by the stereoscopic display device, such as 2, 4, 8, or 16. The operation control module 227 can read the corresponding device parameter from the device parameter data table stored in advance based on the device identification data of the selected stereoscopic display device. The device parameter data table can be stored in the storage medium of the cloud server 220 or stored in a network device connected to the cloud server 220, and the present invention is not particularly limited in storage of the device parameter data table.

The operation control module 227 provides the client 210 to set the image adjustment message of the target image based on the obtained user level. In another embodiment, the operation control module 227 selects whether to provide the client 210 to set the image adjustment message based on the obtained user level, for example, when the user level is the level of non-member, the operation control module 227 does not provide the client 210 to set the image adjustment message; when the user level is the level of basic member, the operation control module 227 provides the client 210 to set the image adjustment message in a simpler way; when the user level is the level of advanced member, the operation control module 227 provides the client 210 to set the image adjustment message in a simpler or more complete way selectively. However, the present invention is not limited to the above-mentioned examples.

When the cloud transmission module 221 receives the multi-view image transmitted by the file conversion server 230, the image storage-query module 229 stores the multi-view image received by the cloud transmission module 221, and stores the image identification data of the multi-view image received by cloud transmission module 221 and the device identification data of the stereoscopic display device 250 as a record in a device image correspondence table. The device identification data of the stereoscopic display device 250 stored by the image storage-query module 229 can include the conversion completion message transmitted by the file conversion server 230 and the device information received by the cloud transmission module 221.

When the cloud transmission module 221 receives an image query request transmitted by the stereoscopic display device 250, the image storage-query module 229 reads the corresponding image identification data of the multi-view image from the stored device image correspondence table based on the device identification data included in the image query request. After reading the multi-view image based on the image identification data, the cloud transmission module 221 transmits the read multi-view image to the stereoscopic display device 250.

The file conversion server 230 is configured to generate the multi-view image based on the target image selected by the cloud server 220 and the device parameter generated by the cloud server 220. In another embodiment, the processor of the file conversion server 230 includes a server transmission module 231, a depth generation module 235, a depth enhancement module 237, and an image generation module 239. In an embodiment, the processor can include an additional image adjustment module 233. The processor can generate the multi-view image through the above modules.

The server transmission module 231 is configured to receive the target image and the device parameter (and the user level) transmitted by the cloud server 220, through the communication interface of the file conversion server 230. In another embodiment, the server transmission module 231 can receive the image adjustment message transmitted by the cloud server 220. In an embodiment, the server transmission module 231 transmits the file conversion completion message and the multi-view image generated by the image generation module 239 to the cloud server 220 through the communication interface of the file conversion server 230.

The image adjustment module 233 crops the target image based on the cropping range in the image adjustment message received by the server transmission module 231, and can scale the size of the target image to match the device parameter based on the scaling message in the image adjustment message, that is, The image adjustment module 233 can scale the target image to make a resolution of the adjusted target image the same as the resolution of the displayer of the stereoscopic display device 250.

The depth generation module 235 is configured to use the deep learning model to generate a depth map of the target image received by the server transmission module 231. In the present invention, the depth map generated by the depth generation module 235 is also called an initial depth map. The depth map generated by the depth generation module 235 is a grayscale image, and the value of each pixel in the depth map represents the depth of the corresponding pixel in the scene of the target image, that is, the distance between the scene corresponding to the pixel and the camera that generated the target image.

It is explained that the target image can be single image or multiple images, the deep learning model used by the depth generation module 235 to generate the depth map can also be different. For example, when the target image is single image, the deep learning model can be a combination of a transformer model and a convolutional neural network (CNN), such as Dense Prediction Transformer (DPT), or Mixed-Dataset Depth Estimation (MiDaS), or can also be a self-supervised learning model, such as Monodepth2 and other Monodepth models, or can be a Neural Radiance Fields (NeRF) model such as NeRF, Mip-NeRF, or Instant-NGP. When the target image contains multiple images, the deep learning model calculates the depth map through parallax, feature matching, and geometric reconstruction, for example, the deep learning model can be a deep learning method for multi-view depth estimation based on convolutional neural networks or transformer models, such as Multi-View Stereo Network (MVSNet), DeepMVS, or Multi-View Depth Estimation Network (MVDepthNet), or can also be a combination of Multi-View Stereo (MVS) and deep learning, or can be the above-mentioned NeRF models.

In another embodiment, the depth generation module 235 can determine the conversion time interval based on the user level received by the server transmission module 231, and can determine whether the conversion time interval is satisfied based on the current time and last conversion time; the depth generation module 235 usually determines whether the conversion time interval is less than or equal to the difference between the current time and the last conversion time, and if the conversion time interval is less than or equal to the difference between the current time and the last conversion time, the depth generation module 235 can generate an initial depth map, so the depth enhancement module 237 can perform an image enhancement computation on the initial depth map to generate the depth-enhanced image, and the image generation module 239 can generate the multi-view image based on the depth-enhanced image. When the depth generation module 235 determines that the conversion time interval is not satisfied based on the current time and last conversion time, the depth generation module 235 does not generate the initial depth map, so the depth enhancement module 237 does not generate the depth-enhanced image and the image generation module 239 does not generate the multi-view image.

The depth enhancement module 237 is configured to perform one or more image enhancement computation on the initial depth map generated by the depth generation module 235 to generate another depth map. In the present invention, the depth map generated by the depth enhancement module 237 is also called a depth-enhanced image. Through the image enhancement computation, the depths of the depth map are corrected and enhanced to make the best adjustment for the stereoscopic effect in visual viewing.

For example, when the conversion parameter indicates to perform the image enhancement computations including brightness expansion and equalization on the depth map, the depth enhancement module 237 performs a linear transformation on each of brightness intervals of the depth map to generate another depth map with more stereo depth details and increased image color contrast; when the conversion parameter indicates to perform the image enhancement computation including low-pass filtering on the depth map, the depth enhancement module 237 performs a smoothing process on the depth map to generate another depth map; when the conversion parameter indicates to perform the image enhancement computation including a depth-constrained linear transformation on the depth map, the depth enhancement module 237 generates another depth map that conforms to visual perception rules. It should be noted that the depth map of the various image enhancement computations performed by the depth enhancement module 237 can be the initial depth map or other depth map generated by image enhancement computations. In other words, the depth enhancement module 237 can perform another image enhancement computation on the depth map generated by one image enhancement computation, and continue to perform different image enhancement computations to generate the depth-enhanced image. It is explained that the depth enhancement module 237 can performs of one, two, or all of image enhancement computations including the above brightness extension and equalization, low-pass filtering, and depth-constrained linear transformation to generate the depth-enhanced image, and the above image enhancement computations usually have no restriction on the order of execution. For example, the depth enhancement module 237 can perform only two image enhancement computations, for example, the depth enhancement module 237 first performs brightness extension and equalization on the depth map to generate an intermediate image, and then performs low-pass filtering on the intermediate image to generate the depth-enhanced image; alternatively, the depth enhancement module 237 can first perform brightness extension and equalization or low-pass filtering on the depth map to generate an intermediate image, and then performing depth-constrained linear transformation image enhancement computation on the intermediate image to generate the depth-enhanced image.

The image generation module 239 determines a grating film property corresponding to the grating film of the stereoscopic display device 250 based on the device parameter received by the server transmission module 231. The grating film property proposed by the present invention includes the number of parallax images, a parallax range, and a viewing distance of the displayer of the stereoscopic display device 250, but the present invention is not limited to these examples. For example, when the device parameter includes the model of the stereoscopic display device 250, the image generation module 239 can read the corresponding grating film property from the model data table stored in advance based on the model of the stereoscopic display device 250 included in the device parameter, but the present invention is not limited to the above-mentioned examples. The model data table can be stored in the storage medium of the file conversion server 230 or stored in a network device connected to the file conversion server 230, but the present invention is not particularly limited in storage of the model data table.

For example, the image generation module 239 can calculate the number of parallax image of the stereoscopic display device 250 to determine the grating film property of the stereoscopic display device 250 based on the width of the displayer of the stereoscopic display device 250 and a width of single grating unit in the grating film of stereoscopic display device 250, for example, the number of parallax images can be the quotient of the width of the displayer divided by the width of the single grating unit. In an embodiment, the image generation module 239 obtains the pixel pitch of the displayer and the pitch of the grating in the grating film, and calculates the division result of the pixel pitch divided by the pitch of the grating as the number of parallax images. The pixel pitch and the pitch of the grating can be recorded in the property parameter, and the pixel pitch can also be calculated based on the resolution, the diagonal size, and the width of the displayer in the property parameter; for example, the pixel pitch can be the division result of the width of the displayer divided by the horizontal resolution of the displayer; the width of the displayer can be calculated by dividing the diagonal size of the displayer by the square root of 1 plus the square of the vertical resolution divided by the horizontal resolution.

The image generation module 239 is configured to generate the multi-view image based on the depth-enhanced image generated by the depth enhancement module 237 and the grating film property determined for the stereoscopic display device 250. The multi-view image generated by the image generation module 239 includes display images with different viewing angles. More specifically, the image generation module 239 calculates the disparity based on the depth map, and the image generation module 239 shifts the pixels in the image based on the depth information to generate stereo pair images through depth-based image warping, and further generates the multi-view image with the same number of display images as the number of parallax images. The viewing angle of the display image can be the angle between the front of an object (such a person) in the display image and a to-be-presented direction of the object in the display image, for example, when the viewing angle of the front of the object is set as zero degrees and the object in the display image is presented by a right angle of 45 degrees (that is, the object in the display image is viewed from the right side of the object at 45 degrees), the viewing angle of the display image is 45 degrees.

When generating the multi-view image, the image generation module 239 can interleave subpixels of each of the pixels in each of the display images to generate a multi-view image, thereby improving the clarity and 3D visual effect of the multi-view image. The subpixel usually emits a single color (R/G/B) of the three primary colors. for example, as shown in FIG. 4, when the multi-view image 420 is generated by interleaving the subpixels of two display images 411 and 412, the subpixels (R/G/B) in each pixel of the display image 411 and the subpixels (R/G/B) in each pixel of the display image 412 can be interleaved to generate the multi-view image 420, so that the multi-view image 420 presents the display image 411 and the display image 412 at different viewing angles through the grating 450, respectively.

After the multi-view image provided to the stereoscopic display device 250 is generated, the image generation module 239 can generate a file conversion completion message corresponding to the same stereoscopic display device 250. In an embodiment, the file conversion completion message generated by the image generation module 239 can include the image identification data of the generated multi-view image, and the device identification data of the stereoscopic display device 250 corresponding to the multi-view image. In an embodiment, the image identification data can be a file name, and the device identification data can be a serial number of the stereoscopic display device 250 or a serial number of a specific hardware component, but the present invention is not limited to the above examples.

The stereoscopic display device 250 displays the multi-view image generated by the file conversion server 230 in a three-dimensional manner. In an embodiment, the processor of the stereoscopic display device 250 includes a device transmission module 251 and a device display module 253.

The device transmission module 251 is configured to download the multi-view image generated by the file conversion server 230 through the communication interface of the stereoscopic display device 250. The device transmission module 251 can connect to the file conversion server 230 to download the multi-view image generated by the file conversion server 230, or can connect to the cloud server 220 to download the multi-view image stored in the cloud server 220 transmitted from the file conversion server 230, but the present invention has no special limitations. In some embodiments, the device transmission module 251 generates the image query request containing device identification data at regular intervals or at fixed times and transmits the image query request to the cloud server 220 to query whether there is a multi-view image converted completely. When there is no multi-view image, the device transmission module 251 waits for the next execution. When the file conversion server 230 has generated the multi-view image or the cloud server 220 has stored the multi-view image, the device transmission module 251 downloads the multi-view image from the file conversion server 230 or the cloud server 220.

The device display module 253 displays the multi-view image received by the device transmission module 251. In some embodiments, the device display module 253 converts the multi-view image received by the device transmission module 251 into multiple display images and displays the converted display images.

The device display module 253 includes a grating film, and the grating film includes grating having grating units. Generally, the size of the grating film is the same as the size of the displayer or touch screen of the output unit of the stereoscopic display device, but the present invention is not limited to this example.

The device display module 253 displays the multi-view image downloaded by the device transmission module 251, and superimposes the displayed multi-view image with the grating in the grating film, to present the corresponding display images in the multi-view image at different viewing angles through optical principles respectively, thereby creating a layered image through the visual illusion caused by the image protruding from the screen and the image receding into the screen.

The device display module 253 can selectively determine whether to display the multi-view image based on the display mode received by the device transmission module 251. More specifically, when the display mode is a planar image mode, the device display module 253 displays the planar target image and the grating does not work; and when the display mode is a stereoscopic image mode, the display device 253 displays the multi-view image and present a three-dimensional image by superimposing the grating with the multi-view image.

An embodiment will be described to explain the operating system and method of the present invention. Please refer to FIG. 3A, which is a flowchart of a method of converting a 2D image to a multi-view image for stereoscopic display, according to the present invention.

in a step 310, the cloud transmission module 221 of the cloud server 220 provides the client 210 to connect to the cloud server 220, and the operation control module 227 of the cloud server 220 obtains the user level of the client 210 after the client 210 is connected to the cloud server 220. In this embodiment, the user level can include levels of non-member, basic member, and advanced member. When the client 210 transmits the user identification data after connecting to the cloud server 220 or the operation control module 227 obtains the user identification data based on the login data or account data transmitted by the client 210, the operation control module 227 queries the user level of the client 210 based on the user identification data of the user of the client 210, and when the client 210 does not transmit the user identification data, the operation control module 227 obtains the user level as the level of non-member.

After the operation control module 227 of the cloud server 220 obtains the user level of the client 210 connected to the cloud server 220, the operation control module 227 provides the client 210 to select a 2D target image through the cloud transmission module 221 of the cloud server 220, provides the client 210 to set the device parameter of the stereoscopic display device 250, and transmits the target image selected by the client 210 and the device parameter to the file conversion server 230 through the cloud transmission module 221 in a step 320. In this embodiment, the target image is a 2D image and the device information includes the model and the device identification data of the stereoscopic display device 250.

After the server transmission module 231 of the file conversion server 230 receives the target image and the device parameter transmitted by the cloud server 220, the depth generation module 235 of the file conversion server 230 uses the deep learning model to generate the initial depth map of the target image received by the server transmission module 231, in a step 340. In this embodiment, the deep learning model used by the file conversion server to generate the depth map can be the machine learning model for depth estimation disclosed in the paper "Towards Robust Monocular Depth Estimation: Mixing Datasets for Zero-shot Cross-dataset Transfer" published in IEEE Transactions on Pattern Analysis and Machine Intelligence (Volume: 44, Issue: 3) on Mar. 1, 2022.

After the depth generation module 235 of the file conversion server 230 generates the initial depth map, the depth enhancement module 237 of the file conversion server 230 performs one or more image enhancement computation on the initial depth map generated by the depth generation module 235 to generate the depth-enhanced image, in a step 350. In this embodiment, when the conversion parameter indicates to perform all image enhancement computations, the depth enhancement module 237 follows the flowchart shown in FIG. 3C. The depth enhancement module 237 first performs brightness extension and equalization in image enhancement computations on the initial depth map to generate a first intermediate image with more stereoscopic depth details, and increases the color contrast of the image in a step 351, and then performs low-pass filtering process on the first intermediate image to generate a smoothed second intermediate image in a step 353, and can perform depth-constrained linear transformation on the second intermediate image to generate the depth-enhanced image matching visual perception rules in a step 355.

After the depth enhancement module 237 of the file conversion server 230 generates the depth-enhanced image, the image generation module 239 of the file conversion server 230, determines the grating film property of the stereoscopic display device 250 based on the device parameter received by the server transmission module 231 of the file conversion server 230, in a step 360. In this embodiment, the grating film property of the stereoscopic display device 250 determined by the image generation module 239 can include the number of parallax images, the parallax range and the viewing distance.

It should be noted that in the present invention there is no sequential relationship between the depth generation module 235 of the file conversion server 230 generating the initial depth map, and the depth enhancement module 237 of the file conversion server 230 performing the image enhancement computation on the initial depth map to generate the depth-enhanced image (steps 340 and 350), and the image generation module 239 of the file conversion server 230 determining the grating film property of the stereoscopic display device 250 based on the device parameter (step 360), that is, the image generation module 239 can first determine the grating film property of the stereoscopic display device 250 (step 360), and the depth generation module 235 then generates the initial depth map and the depth enhancement module 237 generates the depth-enhanced image (steps 340 and 350).

After the depth enhancement module 237 of the file conversion server 230 generates a depth-enhanced image and the image generation module 239 of the file conversion server 230 determines the grating film property of the stereoscopic display device 250, the image generation module 239 generates the multi-view image, which contains display images with different viewing angles and matches the grating film property of the stereoscopic display device 250, based on the depth-enhanced image generated by the depth enhancement module 237 in a step 370. In this embodiment, the image generation module 239 can generate the display images having different viewing angles with the same number as the number of parallax images in the grating film property, and can interleave subpixels of each pixel in each display image to generate the multi-view image with interleaved subpixels.

After the image generation module 230 of the file conversion server 230 generates the multi-view image, the device transmission module 251 of the stereoscopic display device 250 downloads the multi-view image generated by the file conversion server 230 in a step 380. In this embodiment, as shown in the flowchart of FIG. 3C, after the image generation module 239 of the file conversion server 230 generates the multi-view image, the file conversion server 230 can generate the conversion completion message corresponding to the multi-view image, the server transmission module 231 of the file conversion server 230 transmits the conversion completion message and the corresponding multi-view image to the cloud server 220, and the image storage-query module 229 of the cloud server 220 can store the multi-view image received by the cloud transmission module 221 of the cloud server 220 and the corresponding conversion completion message in a step 381. The image storage-query module 229 of the cloud server 220 provides the stereoscopic display device 250 to query whether there is the corresponding conversion completion message in a step 383; when there is the conversion completion message, the device transmission module 251 can download the multi-view image generated by the file conversion server 230 from the cloud server 220 in a step 385.

After the device transmission module 251 of the stereoscopic display device 250 downloads the multi-view image generated by the file conversion server 230, the device display module 253 of the stereoscopic display device 250 displays the multi-view image, superimposes the grating in the grating film with the displayed multi-view image, and presents the display images in the multi-view image at different viewing angle through optical principle, respectively, in a step 390.

Therefore, the present invention can provide the number of the target images uploaded by the client based on the user level of the client, and the uploaded target image can be converted into a multi-view image that can be stereoscopically displayed, thereby, and the multi-view image can be superimposed with the grating to present a three-dimensional stereoscopic image.

In an embodiment, as shown in FIG. 3E, before the parameter generation module 227 of the cloud server 220 generates the conversion parameter based on the user level (step 321) and the parameter generation module 227 converts the device information into the property parameter (step 325), the client 210 can select and transmit the payment plan to the cloud server 220 in a step 301. After the cloud transmission module 221 of the cloud server 220 receives the payment plan, the payment processing module 223 of the cloud server 220 provides the client 210 to complete the payment operation corresponding to the selected payment plan in a step 303. After the client 210 completes the payment operation, the level setting module 225 of the cloud server 220 sets the user level of the client 210 based on the payment plan in a step 305.

In addition, as shown in the flowchart of FIG. 3B, the above embodiment can also include the following steps. When the cloud transmission module 221 of the cloud server 220, provide the target image selected and the device parameter set by the client 210 based on the user level (step 320), the cloud transmission module 221 can provide the client 210 to set the image adjustment message of the target image based on the user level, in a step 325, so that the cloud transmission module 221 can transmit the target image, the device parameter, the image adjustment message, and the user level to the file conversion server 230.

After the server transmission module 231 of the file conversion server 230 receives the target image, the device parameter, the image adjustment message, the user level, the depth generation module 235 of the file conversion server 230 determines the conversion time interval based on the user level, in a step 331. For example, the conversion time interval for the level of non-member is one day, the conversion time interval for the level of basic member is one hour, and the conversion time interval for the level of advanced member is zero, that is, there is no conversion time interval for the level of advanced member.

The depth generation module 235 of the file conversion server 230 determines whether the determined conversion time interval is satisfied based on the current time and the last conversion time of the user of the same client in a step 333. When the conversion time interval is not satisfied, the depth generation module 235 records the time that satisfies the conversion time interval, and when the recorded time reaches, the depth generation module 235 again determines whether the conversion time interval is satisfied. When the depth generation module 235 determines that the conversion time interval is satisfied, the depth generation module 235 crops the target image based on the cropping range in the image adjustment message received by the server transmission module 231 of the file conversion server 230 in a step 336, and/or when the depth generation module 235 determines that the size of the target image does not match the resolution of the displayer in the device parameter, and the depth generation module 235 selectively scales the target image based on the scaling message in the image adjustment message, to make the size of the adjusted target image match the resolution of the displayer in the device parameter in a step 338. Next, the depth generation module 235 can generate the initial depth map corresponding to the cropped and/or scaled target image in a step 340.

According to above-mentioned contents, the difference between the present invention and the conventional technology is that, in the present invention, the cloud server controls the client to upload the 2D target image, the file conversion server performs the image enhancement computation on the initial depth map of the target image to generate the depth-enhanced image, and generate the multi-view image matching the grating film property of the stereoscopic display device based on the depth-enhanced image, the stereoscopic display device displays the multi-view image, superimposes the grating with the multi-view image to present the display images of the multi-view image by viewing angles, respectively to generate the stereoscopic image through optical principles. With the above-mentioned solution, the present invention can prevent malicious use of image conversion services requiring high cost to set up and achieve the technical effect of providing different conversion processing efficiencies with different payment plans.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method of converting a 2D image to a multi-view image for stereoscopic display, comprises:

providing a client to connect thereto, and obtaining a user level of the client, by a cloud server;

providing the client to select a target image, which is 2D, and set a device parameter of a stereoscopic display device based on the user level, and transmitting the target image and the device parameter to a file conversion server, by the cloud server;

using a deep learning model to generate an initial depth map of the target image, by the file conversion server;

performing at least one image enhancement computation on the initial depth map to generate a depth-enhanced image, by the file conversion server;

determining a grating film property of the stereoscopic display device based on the device parameter, by the file conversion server;

generating a multi-view image that matches the grating film property based on the depth-enhanced image, by the file conversion server, wherein the multi-view image comprises display images and viewing angles of the display image are different from each other;

downloading the multi-view image, by the stereoscopic display device; and displaying the multi-view image by superimposing gratings with the multi-view image to present the display images of the multi-view image by the viewing angles through optical principles, respectively, by the stereoscopic display device.

2. The method of converting a 2D image to a multi-view image for stereoscopic display according to claim 1, wherein before the step of using the deep learning model to generate the initial depth map of the target image by the file conversion server, further comprising:

providing the client to set an image adjustment message of the target image based on the user level, by the cloud server; and cropping the target image based on a cropping range in the image adjustment message, and/or scaling a size of the target image to match the device parameter based on a scaling message in the image adjustment message, by the file conversion server.

3. The method of converting a 2D image to a multi-view image for stereoscopic display according to claim 1, wherein the step of downloading the multi-view image by the stereoscopic display device, comprises:

generating a conversion completion message corresponding to the multi-view image and comprising device identification data in the device parameter, and transmitting the multi-view image and the conversion completion message to the cloud server, by the file conversion server; and providing the stereoscopic display device to query whether there is the conversion completion message, and providing the stereoscopic display device to download the multi-view image when there is the conversion completion message, by the cloud server.

4. The method of converting a 2D image to a multi-view image for stereoscopic display according to claim 1, before the step of obtaining the user level of the client by the cloud server, further comprising:

selecting a payment plan, transmitting the payment plan to the cloud server, by the client; and providing the client to complete the payment operation corresponding to the payment plan, and setting the user level of the client based on the payment plan, by the cloud server.

5. The method of converting a 2D image to a multi-view image for stereoscopic display according to claim 1, before using the deep learning model to generate the initial depth map of the target image by the file conversion server, further comprising:

determining a conversion time interval based on the user level transmitted by the cloud server; and determining whether the conversion time interval is satisfied based on a current time and a last conversion time, by the file conversion server.

6. A system of converting a 2D image to a multi-view image for stereoscopic display, comprising a client;

a cloud server, configured to provide the client to connect thereto, and obtain a user level of the client, provide the client to select a target image, which is 2D, and set a device parameter based on the user level;

a file conversion server, configured to receive the target image and the device parameter, and use a deep learning model to generate an initial depth map of the target image, perform at least one image enhancement computation on the initial depth map to generate a depth-enhanced image, and determine a grating film property based on the device parameter, and generate a multi-view image that matches the grating film property based on the depth-enhanced image, wherein the multi-view image comprises display images and viewing angles of the display images are different from each other; and a stereoscopic display device, corresponding to the device parameter and comprising a grating film, wherein the grating film comprises gratings, and the stereoscopic display device is configured to download the multi-view image, and display the multi-view image by superimposing the gratings with the multi-view image to present the display images of the multi-view image by the viewing angles through optical principles, respectively.

7. The system of converting a 2D image to a multi-view image for stereoscopic display according to claim 6, wherein the cloud server is configured to provide the client to set an image adjustment message of the target image based on the user level, and transmit the image adjustment message to the file conversion server, and the file conversion server is configured to crop the target image based on a cropping range in the image adjustment message and/or scale a size of the target image to match the device parameter based on a scaling message in the image adjustment message.

8. The system of converting a 2D image to a multi-view image for stereoscopic display according to claim 6, wherein the cloud server is configured to transmit the user level to the file conversion server, and the file conversion server is configured to determine a conversion time interval based on the user level, determine whether the conversion time interval is satisfied based on a current time and a last conversion time, and generate the initial depth map, perform the at least one image enhancement computation and generate the multi-view image when the conversion time interval is satisfied.

9. The system of converting a 2D image to a multi-view image for stereoscopic display according to claim 6, wherein the file conversion server is configured to generate a conversion completion message corresponding to the multi-view image and comprising device identification data in the device parameter, and transmit the multi-view image and the conversion completion message to the cloud server, and the cloud server is configured to provide the stereoscopic display device to query whether there is the conversion completion message, and when there is the conversion completion message, the cloud server provides the stereoscopic display device to download the multi-view image.

10. The system of converting a 2D image to a multi-view image for stereoscopic display according to claim 6, wherein the file conversion server is configured to interleave subpixels of each of pixels of each of the display images to generate the multi-view image.

* * * * *